Patented Dec. 7, 1948

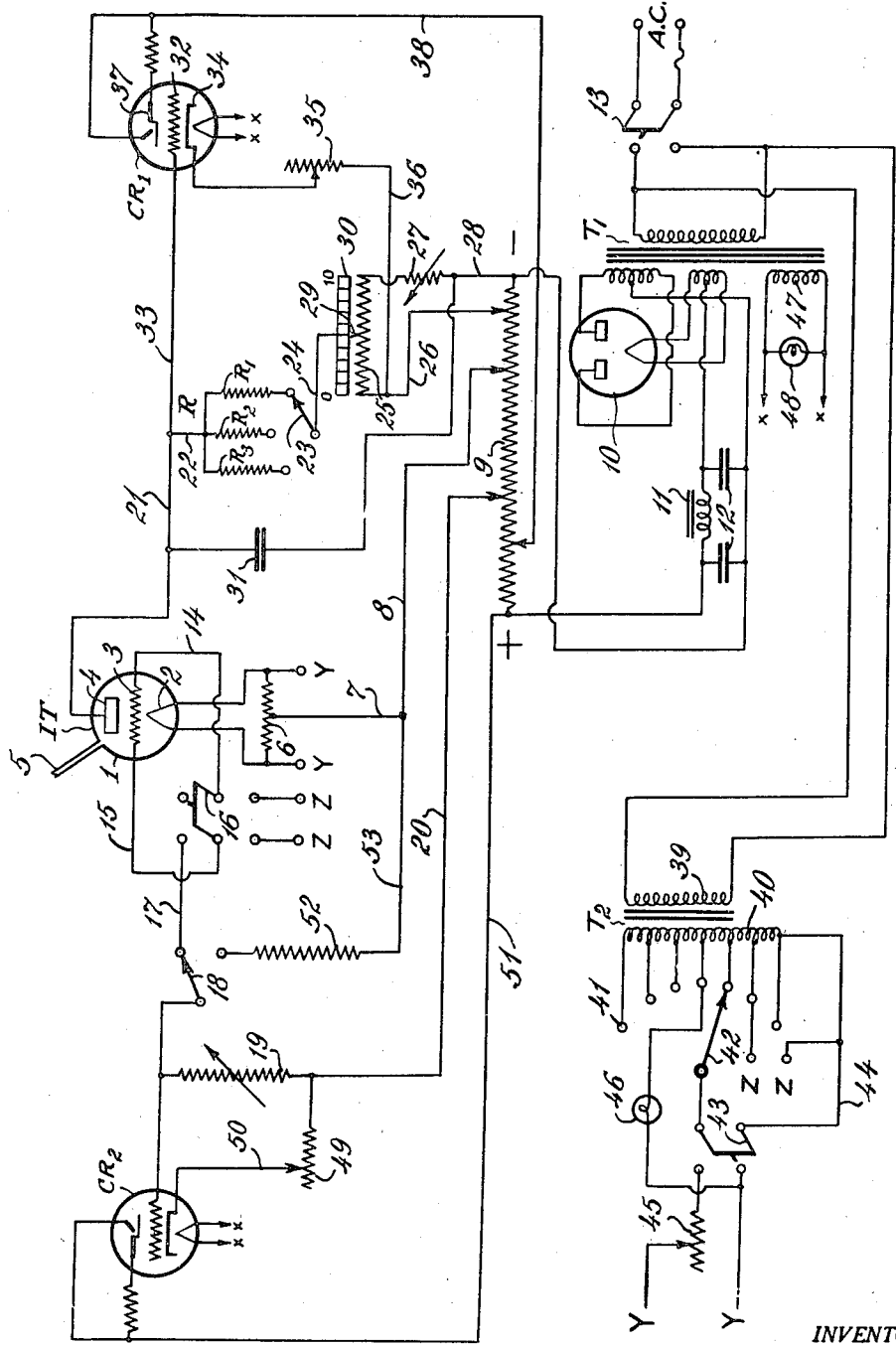

2,455,437

UNITED STATES PATENT OFFICE 2,455,437

IONIZATION GAUGE CIRCUITS

Gerhard R. Nagel and Merriam E. Johnson, Rochester, N. Y., assignors to Distillation Products, Inc., Rochester, N. Y., a corporation of Delaware Application November 13, 1943, Serial No. 510,186

1 Claim. (Cl. 175—183)

This invention relates to ionization gauges, and more particularly to an improved system of electrical circuits and devices for quickly and accurately determining the absolute pressure measured by such gauges.

An ionization gauge is an instrument for measuring low subatmospheric gas pressures, of the order of $10^{-4}$ millimeters of mercury or less, by measurement of the positive ion current flow in the gas at the pressure to be determined. The essential element of such a gauge is a tube or envelope subject to the pressure to be measured and containing a thermionic heated cathode, an anode and a third element termed a positive ion collector plate. The anode is maintained positive with respect to the cathode. The collector plate is maintained slightly negative with respect to the cathode, and the cathode temperature is adjusted to give a fixed electron current flow between cathode and anode. This electron current flow ionizes the atoms or molecules of gas in the region its transverses, and most of the positive ions so formed flow to the collector plate. For gas-pressure below about $10^{-4}$ millimeters of mercury, this positive ion current is directly proportional to the gas pressure in the tube and to the magnitude of the electron current flowing from cathode to anode at any given value of anode potential. With a fixed and predetermined electron current flow, the flow of ion current between the collector plate and the cathode may thus be used as a direct index of the gas pressure within the tube.

The positive ion current ordinarily ranges in value from a fraction of a microampere to 100 microamperes or more. Accurate measurement of this current without disrupting the factors that produce it and without the use of expensive indicating instruments and other adjuncts is a difficult problem. It is the object of the present invention to provide a system comprising a combination of electrical circuits and devices for rapidly and accurately measuring the positive ion current of an ionization tube and so directly determining the absolute pressure of the gas therein. A further object is to provide a system of this nature in which variations in voltage employed to operate the circuits are cancelled out rather than magnified whereby the system may be operated without the use of standard cells, voltmeters or like expensive adjuncts. Another object is to provide a circuit in which the various voltage adjustments incident to operation and calibration can be made independently and without troublesome changes in voltage in other parts of the system. The invention further provides a system of the type described in which ordinary commercial vacuum tubes may be used without pre-selection and without impairment of the accuracy of operation. Various other specific objects and advantages of the invention will be apparent from the following description of a typical embodiment thereof.

In describing the invention in detail, reference will be made to the accompanying drawing in which the single figure is a diagrammatic and simplified representation of the circuits and devices making up a system embodying the present invention.

In the drawing, IT represents an ionization tube comprising an envelope 1 enclosing a filament or cathode 2, an anode 3 and a positive ion collector plate 4. The envelope 1 is provided with a connecting duct 5 by means of which the gas pressure to be measured may be imposed on the tube. The cathode 2 is connected through a center tapped resistor 6 and wires 7 and 8 with a tap on the voltage dividing resistor 9 of a source of unidirectional potential.

As shown, unidirectional potential is applied across the resistor 9 by a vacuum tube rectifier of conventional design. This includes a power transformer T1 energizing the plates and filament circuits of a full wave rectifier tube 10, the output circuit of which includes a choke coil 11 and bypass condensers 12. A switch 13 controls the application of alternating current to the primary of the transformer T1 from a suitable source which may be a 110 volt 60 cycle power line.

The anode 3 of the ionization tube IT is arranged to be heated for degassing, and is accordingly provided with leads 14 and 15 connected to its opposite ends. These leads run to a double pole double throw switch 16 which in its upper position connects the anode 3 through lead 15 to the wire 17, and in its lower position connects the leads 14 and 15 across a degassing current circuit ZZ to be described. The anode 3 is maintained at a positive potential with respect to the cathode 2. To this end, the anode 3 is connected through the lead 15, the switch 16, the wire 17, the switch 18, the resistor 19 and the wire 20 to a point on the potential source resistor 9 which is positive with respect to the point at which the cathode 2 is connected thereto.

The positive ion collector plate 4 of the tube IT is provided with an ion current circuit including a source of potential for maintaining the plate 4 slightly negative with respect to the cathode 2. As shown, the plate 4 is connected through the wires 21 and 22, one of the resistors R1, R2 or R3 of an adjustable resistance unit R, the switch arm 23, the wire 24, movable contact 29, a portion of the variable resistor 25 and the wire 26 to a point on the resistor 9 which is negative with respect to that at which the cathode 2 is connected to this resistor.

In accordance with the invention, the voltage set up by the flow of positive ion current through the resistance unit R is opposed by a voltage of opposite polarity set up across the resistor 25, and the portion of the resistor 25 included in the circuit is varied until these voltages are equal, whereupon the magnitude of the positive ion current and thus the gas pressure within the ionization tube can be determined from the settings of the adjustable resistance unit R and the movable contact 29 of the variable resistor 25. One end of the variable resistor 25 is connected by the wire 26 to a point on the potential source resistor 9 near its negative end, and the other end of the resistor 25 is connected through a variable calibrating resistor 27 and a wire 28 to the negative end of the resistor 9. The movable contact 29 of the resistor 25 is provided with a suitable scale 30 for indicating the portion of this resistor included in the positive ion current circuit. By suitable adjustment of the variable resistor 27 and choice of a suitable scale 30, movement of the pointer 29 may be arranged to directly indicate the gas pressure in the ionization tube under standard conditions of electron current flow therein. A suitable visual indicator, preferably a cathode ray tube CR1, is employed to indicate adjustment of the variable resistor 25 at the point where the opposite voltages in the ion current circuit are equal. A bypass condenser 31 is connected across the resistors R, 25 and 27.

The cathode ray tube CR1 is of a known type in which the effects of a change in controlling voltage applied to the grid-cathode circuit is visually indicated on a fluorescent target. The construction and operation of such tubes is well known in the art and will not be described in detail. It is sufficient to explain that the luminous target is substantially circular and that a control electrode produces a shadow angle thereon which decreases as the grid potential changes in the negative direction and widens as the grid potential changes in the positive direction.

The grid-cathode circuit of the tube CR1 is connected across that portion of the positive ion circuit which contains the series connected resistances R and 25. Thus the grid 32 of the cathode ray tube is connected by a wire 33 to the wire 22 and the cathode 34 thereof is connected through a variable biasing resistor 35 and a wire 36 to the wire 26. Positive potential is applied to the plate 37 of the cathode ray tube by a wire 38 connected to the potential source resistor 9.

In order that the positive ion current of the tube IT may accurately indicate the gas pressure therein, the electron current from cathode 2 to anode 3 must be maintained at a predetermined value. This electron current is adjusted by varying the cathode heating current, and adjustment to the desired value is indicated by a second cathode ray tube CR2 of the same type as that described above. A transformer T2 has a primary winding 39 connected in parallel with the primary of the transformer T1. The secondary winding 40 of the transformer T2 is provided with a plurality of taps 41, selectively engageable by a switch arm 42 connected to one terminal of a cathode current switch 43. The other terminal of the switch 43 is connected to one end of the transformer secondary 40 by a wire 44. Degassing current for the ionization tube anode 3 is supplied from the terminals ZZ connected respectively to the wire 44 and one of the secondary taps 41. The cathode current switch 43 is connected to the cathode terminals YY through a rheostat 45. A pilot light 46 may be connected across the cathode current circuit as shown.

Heater current is supplied to the cathode heater terminals XX of the cathode ray tubes CR1 and CR2 from a secondary 47 on the transformer T1, and a pilot light 48 may be connected in parallel with this supply as shown.

The grid-cathode circuit of the tube CR2 is connected across the resistor 19 in the ionization anode circuit, and a variable grid biasing resistor 49 is included in the cathode lead 50 as shown. Positive plate potential for the tube CR2 is supplied by the wire 51 connected to the positive end of the potential supply resistor 9. By throwing the switch 18 to its lower position, the grid-cathode circuit of the tube CR2 is connected across a portion of the potential supply resistor 9 through a fixed resistor 52 and the wires 53, 8 and 20.

In employing the described embodiment of our invention to measurement of gas pressures, the ionization tube IT is connected through the duct 5 to a vessel containing the gas under pressure to be measured. Then with the cathode current switch 43 open, the rheostat 45 moved to its maximum resistance position and the arm 42 moved to the lowest of the taps 41, the power supply switch 13 is closed. After the filaments of the tubes 10, CR1 and CR2 have warmed up, the cathode current switch 43 is closed and the switch arm 42 is moved to successively higher taps 41 until the ionization tube cathode 2 lights. The cathode current is gradually increased by the rheostat 45 until the shadow angle of the tube CR2 decreases to the minimum, which indicates that the electron current in the anode circuit of the ionization tube is at the desired predetermined value. This indication results from the connection of the grid circuit of the tube CR2 across the resistor 19 in the anode circuit of the ionization tube. The grid biasing resistor 49 of the tube CR2 is adjusted as hereinafter described so that the minimum shadow angle indication of this tube corresponds to the desired anode circuit current.

The movable contact 29 of the variable resistor 25 is moved to the left to its zero position at which all of the resistor 25 is cut out of the grid circuit of the tube CR1. The resistance unit R is set to include the resistor R1 of highest resistance in the positive ion current circuit. Positive ion current flows from the collector plate 4 to the cathode 2 of the ionization tube IT through the resistor R1. This current flow produces a voltage across the resistor R1 which opposes the voltage across the grid bias resistor 35, thus reducing the negative grid bias on the tube CR1 and causing its shadow angle to increase. The contact 29 of the resistor 25 is now moved to the right, introducing into the cathode ray tube grid circuit a voltage of opposite polarity to that developed across the resistor R1 by positive ion current flow. This opposing voltage is adjusted by movement of the contact 29 until the shadow angle of the tube CR1 decreases to the minimum, which indicates that the net voltage imposed on the grid circuit of this tube by the flow of positive ion current is zero. The settings of the resistance unit R and the variable resistance contact 29 now indicate the magnitude of the positive ion current, and by proper calibration may be made to directly indicate the pressure of the gas in the ionization tube IT. Thus for example with the circuits properly adjusted, the resistor R1 may be designated $10^{-6}$ and the position of the contact 29 on the scale 30 may be 5 for a minimum shadow angle on CR1, and in this case the pressure of the gas in the ionization tube would be $5 \times 10^{-6}$. If the minimum shadow angle cannot be obtained with full scale movement of the contact 29, the switch arm 23 of the unit R is moved to insert the resistor R2 of the next lowest resistance, and the movable contact 29 is adjusted for minimum shadow angle. The variable resistor 27 may be adjusted so that the position of the contact 29 on the scale 30 indicates gas pressures directly.

For proper operation, the grid bias of the cathode ray tube CR2 must be so adjusted that a minimum shadow angle thereon indicates the desired predetermined electron current in the anode circuit of the ionization tube IT, and the grid bias of the tube CR1 must be so adjusted that a minimum shadow angle on this tube indicates zero net voltage across the portion of the positive ion current circuit common to the grid circuit of CR1. To make the first of these adjustments, the cathode current switch 43 is opened, the switch 18 is moved to its lower position and a current limited by the resistor 52 to the magnitude desired in the anode circuit flows through the resistor 19 across which the grid circuit of the tube CR2 is connected. The grid bias resistor 49 is then adjusted until the shadow angle of the tube CR2 is reduced to a minimum. Thereafter, when anode circuit current flows through the resistor 19, a minimum shadow angle on CR2 indicates that this current is adjusted to the desired working value.

To adjust the grid bias resistor of the tube CR1, the switch 43 is opened so that no positive ion current flows, the movable contact 29 is moved to its extreme left hand position to cut all of the resistor 25 out of the grid circuit and the biasing resistor 35 is then adjusted until the shadow angle of the tube CR1 is reduced to the minimum.

From the foregoing description, it will be apparent that by the use of our improved system, low subatmospheric gas pressures may be directly, accurately and quickly determined without the use of expensive meters or standard voltage cells. Due to the arrangement of the circuits, minor variations in operating voltages due to the usual fluctuations in line voltage tend to cancel out rather than produce cumulative inaccuracies. For example, an increase in anode voltage of the ionization tube which would normally tend to increase the positive ion current is opposed by a corresponding increase in the voltage introduced in the positive ion circuit by the resistor 25. Each of the several voltage adjustments required for zero setting of the cathode ray tubes, adjustment of the anode current of the ionization tube and pressure determination are made without disturbing the voltage distribution in other parts of the system, whereby the adjustment and calibration of the system is simplified. The cathode ray tubes may be operated at a grid bias corresponding to extreme low grid current and accordingly measurements of pressures as low as $10^{-7}$ millimeters of mercury may be obtained. Standard commercial cathode ray tubes may be employed without pre-selection, and the zero setting of these tubes is a simple matter.

We claim:

In a system of the type described, in combination, an ionization tube having a cathode, an anode and a positive ion collector plate, an anode circuit connecting said anode and said cathode and including a resistor and a source of unidirectional potential, means for varying the flow of current in said anode circuit, a positive ion current circuit connecting said collector plate and said cathode and including in series a resistance unit, a variable source of unidirectional potential having a polarity opposite to that of the voltage generated across said resistance unit by the flow of positive ion current therethrough, two cathode ray tubes each having a grid circuit, means for connecting the grid circuit of one of said cathode ray tubes across the resistor in said anode circuit and means for connecting the grid circuit of the other of said cathode ray tubes across the portion of said positive ion current circuit including said resistance unit and said variable source of unidirectional potential.

GERHARD R. NAGEL.
MERRIAM E. JOHNSON.

REFERENCES CITED

The following references are of record in the file of this patent:

UNITED STATES PATENTS

| Number | Name | Date |
|---|---|---|
| 1,334,143 | Dushman | Mar. 16, 1920 |
| 1,372,798 | Buckley | Mar. 29, 1921 |
| 1,566,279 | King | Dec. 22, 1925 |
| 1,649,016 | Buckley | Nov. 15, 1927 |
| 1,931,763 | Jackson | Oct. 24, 1933 |
| 1,969,518 | Moles | Aug. 7, 1934 |
| 2,099,349 | Rosebury | Nov. 16, 1937 |
| 2,122,267 | Wagner | June 28, 1938 |
| 2,167,842 | Jackson | Aug. 1, 1939 |
| 2,235,173 | Shepard | Mar. 18, 1941 |

OTHER REFERENCES

Instruments, October 1934, pp. 205–206.
Electrical Times, September 17, 1942, pp. 400–402.
Wireless World, July 1943, pp. 202–204.